(12) United States Patent
Wang

(10) Patent No.: US 7,907,500 B2
(45) Date of Patent: Mar. 15, 2011

(54) RADIO FREQUENCY ZERO CROSSING SIGNAL GENERATOR FOR OPTICAL DISC DRIVE

(75) Inventor: Te-Ju Wang, Taoyuan County (TW)

(73) Assignee: Princeton Technology Corporation, Taipei County (TW)

( * ) Notice: Subject to any disclaimer, the term of this patent is extended or adjusted under 35 U.S.C. 154(b) by 888 days.

(21) Appl. No.: 11/790,003

(22) Filed: Apr. 23, 2007

(65) Prior Publication Data

US 2008/0116967 A1   May 22, 2008

(30) Foreign Application Priority Data

Nov. 17, 2006   (TW) ................................ 95142549 A

(51) Int. Cl.
*G11B 7/135* (2006.01)
(52) U.S. Cl. ............. 369/112.22; 369/30.46; 369/30.47; 369/30.58; 369/30.59; 369/30.73; 369/30.74; 369/30.88; 369/30.89; 369/215.1; 369/219.1
(58) Field of Classification Search .................. None
See application file for complete search history.

(56) References Cited

U.S. PATENT DOCUMENTS

| 6,051,997 | A  | * | 4/2000 | Yeung et al. | ..................... 327/58 |
| 2002/0064009 | A1 | * | 5/2002 | Andoh | ............................. 361/58 |
| 2002/0118235 | A1 | * | 8/2002 | Narazaki et al. | .................. 347/5 |
| 2002/0181374 | A1 | * | 12/2002 | Lai | ............................. 369/53.35 |

FOREIGN PATENT DOCUMENTS

TW         I258738        7/2006

* cited by examiner

*Primary Examiner* — Joseph Haley
*Assistant Examiner* — Ifedayo Iluyomade
(74) *Attorney, Agent, or Firm* — Muncy, Geissler, Olds & Lowe, PLLC

(57) ABSTRACT

The invention discloses radio frequency zero crossing signal generators for optical disc drives, comprising a controllable low pass filter, a comparator, and a control circuit. The controllable low pass filter evaluates an average level of the magnitude of a radio frequency ripple from an optical disc drive. The comparator compares the radio frequency ripple to the average level evaluated by the controllable low pass filter to generate a radio frequency zero crossing signal. When the optical disc drive reads a fingerprint defect on an optical disc, the control circuit adjusts a cut-off frequency of the controllable low pass filter to adjust the speed at which the controllable low pass filter evaluates the average level.

7 Claims, 7 Drawing Sheets

RADIO FREQUENCY ZERO CROSSING SIGNAL GENERATOR FOR OPTICAL DISC DRIVE

BACKGROUND OF THE INVENTION

1. Field of the Invention

The invention relates to optical disc drives, and particularly to radio frequency zero crossing signal generators for optical disc drives.

2. Description of the Related Art

FIG. 1 shows essential signals for optical disc tracking, comprising a tracking error signal TE, a tracking error zero crossing signal TEZC, a radio frequency ripple RFRP, and a radio frequency zero crossing signal RFZC. The optical disc drive precedes a cross track motion, and the optical pick-up of the optical disc drive moves from the inner track to the outer track. In such a case, the waveform of the radio frequency ripple is similar to a sinusoid wave. The peaks of the radio frequency ripple RFRP indicate the locations of tracks. The wave troughs of the radio frequency ripple RFRP indicate that the optical pick-up of the optical disc drive is right between the tracks, and no data is obtained. The optical disc drive evaluates an average level for the magnitude of the radio frequency ripple RFRP (ZC), and compares the radio frequency ripple RFRP with the average level ZC to generate the radio frequency zero crossing signal RFZC. As shown in FIG. 1, when the optical disc drive makes a cross track motion, the tracking error signal TE detected by the optical pick-up is also similar to a sinusoid. When the optical pick-up reads a track or is right between the tracks, the tracking error signal TE is zero. The tracking error zero crossing signal TEZC is generated by comparing the tracking error signal TE with zero '0'. When the radio frequency zero crossing signal RFZC is high, conventional methods of tracking an optical disc determine the locations where the tracking error zero crossing signal TEZC switches from high to low or from low to high as the locations of tracks. Referring to FIG. 1, the marks 102 indicate the locations of tracks.

In conventional methods of tracking an optical disc, the accuracy of tracking result is dependent on the accuracy of the average level ZC. The upper waveform of FIG. 2 shows a radio frequency signal RF during a cross tracking motion, wherein there are a defect (e.g. a scrape) in region 202 and a fingerprint defect in region 204. The optical pick-up scans the optical disc from the inner track to the outer track and generates the radio frequency signal RF dependent on the reflection of the disc. Because the frequency of the radio frequency signal RF is very high, the waveform of the radio frequency signal RF shown in FIG. 2 is simplified and only the top edge and the bottom edge of the radio frequency signal RF are shown. The lower waveform of FIG. 2 shows a radio frequency ripple RFRP corresponding to the radio frequency signal RF. The RFRP signal is generated by inverting the bottom edge of the radio frequency signal RF. The defect (e.g. scrape) damages the cover coating of the optical disc, so that no radio frequency signal RF can be read out (referring to region 202 of the radio frequency signal RF). Thus, the radio frequency ripple RFRP corresponding to the defect region 202 is high. The average level of the radio frequency ripple RFRP is dramatically shifted upward in the defect region 202. It requires a long time for conventional techniques to restore the dramatically shifted average level to a normal range. Referring to fingerprint defect region 204, the reflection of the optical disc is changed, and the average level of the radio frequency ripple signal RFRP is shifted accordingly. As shown in FIG. 2, the fingerprint defect region 204 dramatically shifts the average level of the radio frequency ripple RFRP upward. Conventional tracking techniques cannot catch up with the dramatic variation of the average level. The average level evaluated by the conventional techniques is usually inaccurate, thus the tracking result is unreliable. Tracking techniques generating real-time and accurate average level of the radio frequency ripple RFRP are thus called for.

FIG. 3 shows a conventional radio frequency zero crossing signal generator 300, comprising a peak hold circuit 302 and a bottom hold circuit 304 implemented by charge pumps. The peak hold circuit 302 and the bottom hold circuit 304 both receive the radio frequency ripple RFRP, and generate the peak value PH and the bottom value BH of the radio frequency ripple RFRP, respectively. The average of the peak value and the bottom value, (PH+BH)/2, is evaluated by an operation circuit 306, and is considered as the average level of the radio frequency ripple RFRP (ZC). The radio frequency zero crossing signal RFZC is generated by a comparator 308 by comparing the radio frequency ripple RFRP with the average level ZC.

Because charge pumps have fast response, the conventional radio frequency zero crossing signal generator 300 is capable of evaluating accurate average level ZC, and the radio frequency zero crossing signal RFZC output from the radio frequency zero crossing signal generator 300 has high accuracy. The drawback of the generator 300 is that the charge pumps are costly.

Cheaper radio frequency zero crossing signal generators capable of providing accurate average level ZC are thus called for.

BRIEF SUMMARY OF THE INVENTION

The invention provides radio frequency zero crossing signal generators for optical disc drives, which comprise a controllable low pass filter, a comparator, and a control circuit. The controllable low pass filter is operative to evaluate an average level of a radio frequency ripple of the optical disc drive. The comparator couples to the controllable low pass filter and compares the radio frequency ripple with the average level evaluated by the controllable low pass filter to generate a radio frequency zero crossing signal. The control circuit adjusts the cut-off frequency of the controllable low pass filter to adjust the speed at which the controllable low pass filter evaluates the average level. When the optical pick-up of the optical disc drive reads a fingerprint defect, the control circuit adjusts the cut-off frequency of the controllable low pass filter, and thus the speed at which the controllable low pass filter generates the average level is sufficient to follow the dramatic radio frequency ripple drift caused by fingerprint defects.

In an embodiment of the invention, the controllable low pass filter is a resistor-capacitor low pass filter, comprising a capacitor and a plurality of resistors of distinct resistances. The cut-off frequency of the controllable low pass filter is determined by the control circuit by coupling different resistors to the capacitor.

In an embodiment of the invention, there is no radio frequency signal in a defect region (e.g. scrape on an optical disc). In such a case, the control circuit controls the controllable low pass filter to maintain at the present average level, and stop calculating the average level of the radio frequency ripple until passing the defect region. The controllable low pass filter comprises a capacitor and a plurality of resistors as well as a switch coupling the resistors to the capacitor. The switch is initially turned on, and turned off by the control circuit only when the optical pick-up reads a defect. When the switch is turned off, the charging/discharging paths of the capacitor are cut off, and the average level output from one terminal of the capacitor is maintained.

In one embodiment of the invention, the radio frequency zero crossing signal generator comprises a resistor-capacitor low pass filter, a comparator, and a control circuit. The resistor-capacitor low pass filter is operative to calculate an average level of a radio frequency ripple generated by an optical disc drive. The comparator couples to the controllable low pass filter and compares the radio frequency ripple with the average level provided by the resistor-capacitor low pass filter, and generates a radio frequency zero crossing signal. A cut-off frequency of the resistor-capacitor low pass filter is determined by the control circuit. In addition to the resistors and capacitors contained in conventional resistor-capacitor low filters, the resistor-capacitor low pass filter further comprises an initially turned on switch, coupling the resistors to the capacitor. When the optical pick-up reads a defect, the control circuit turns off the switch to stop charging/discharging the capacitor of the resistor-capacitor low pass filter to hold the value of the average level.

The above and other advantages will become more apparent with reference to the following description taken in conjunction with the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
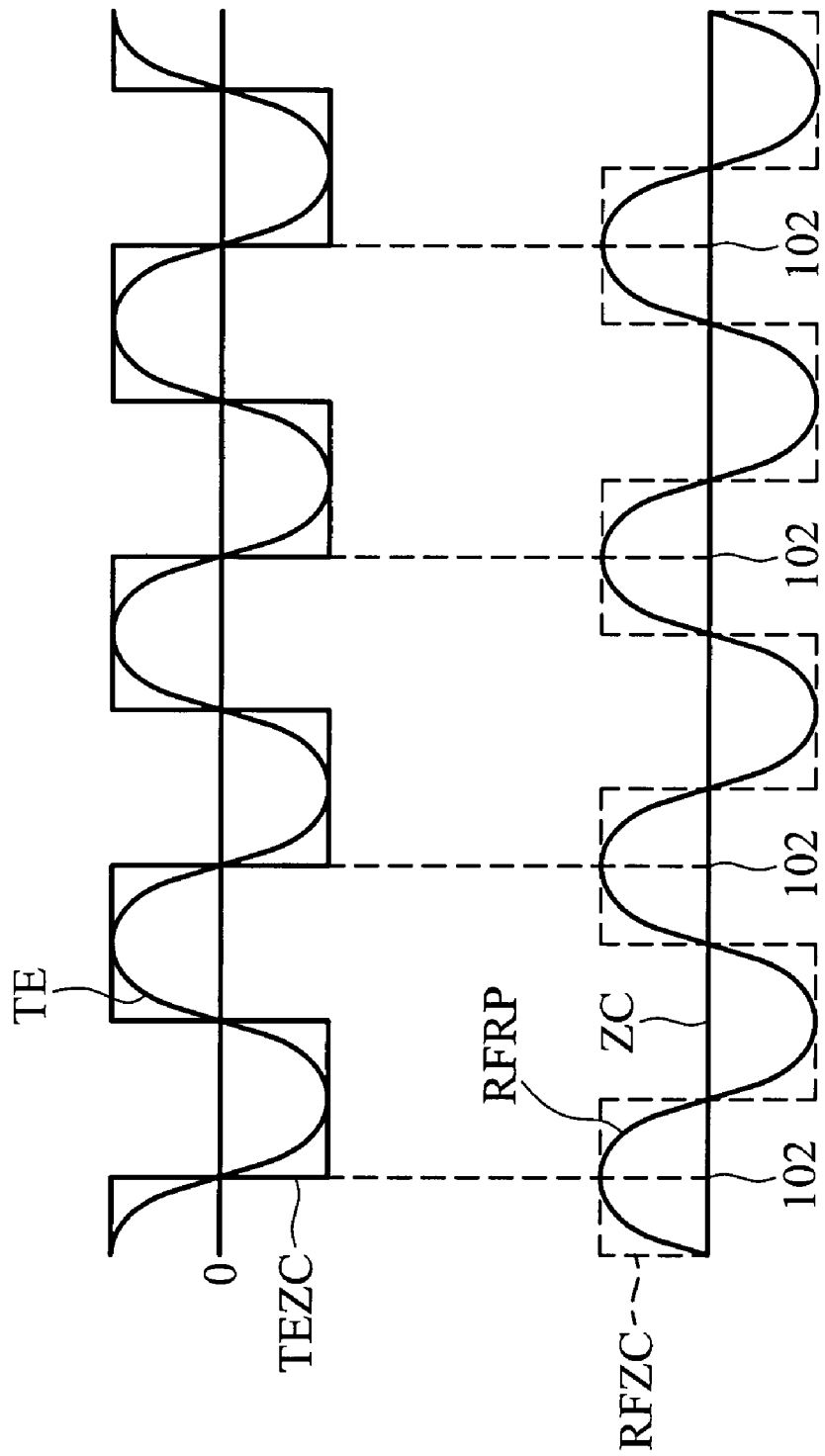
FIG. 1 shows the essential signals for optical disc tracking.
Figure 2:
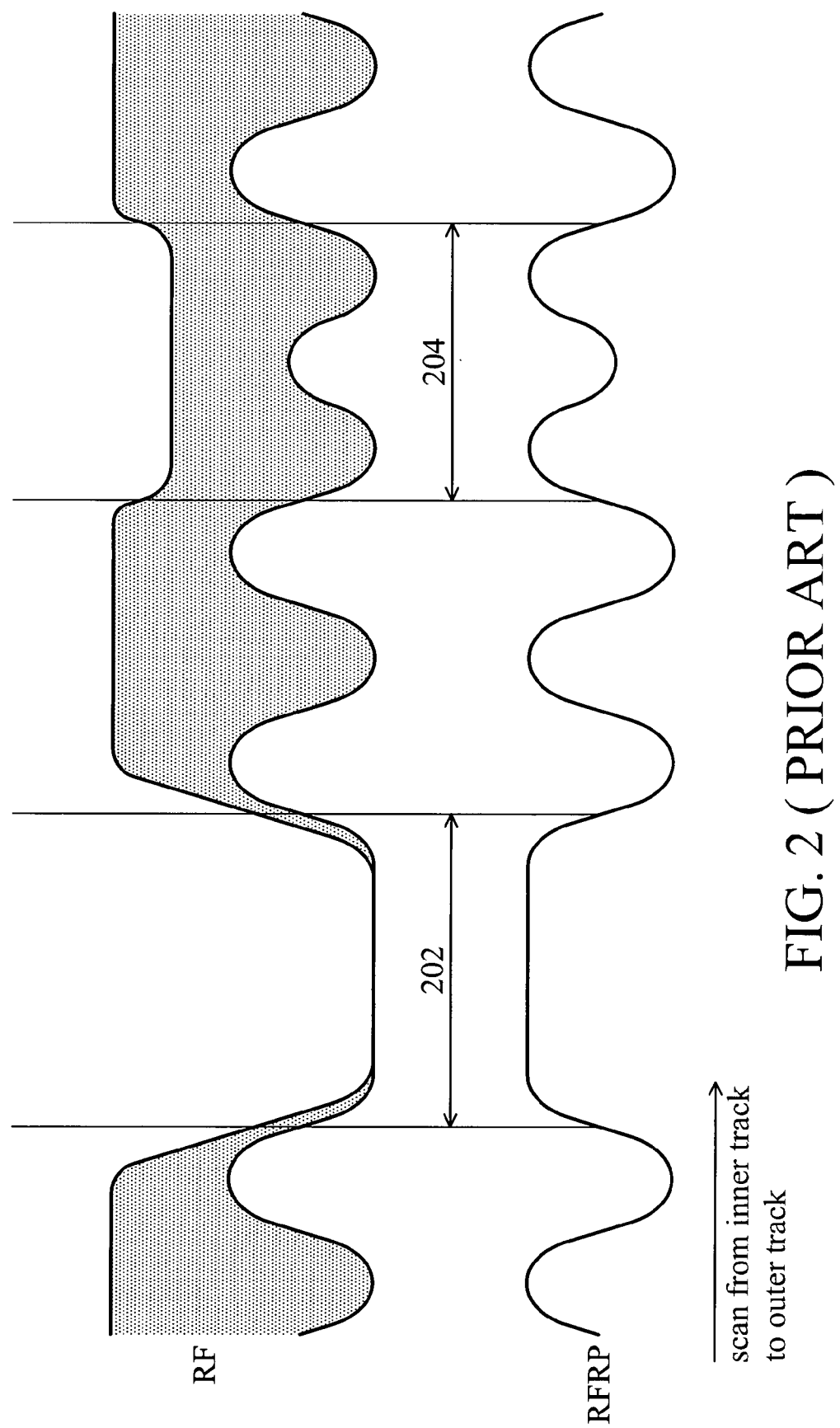
FIG. 2 shows a radio frequency signal during a cross tracking motion and the corresponding radio frequency ripple.
Figure 3:
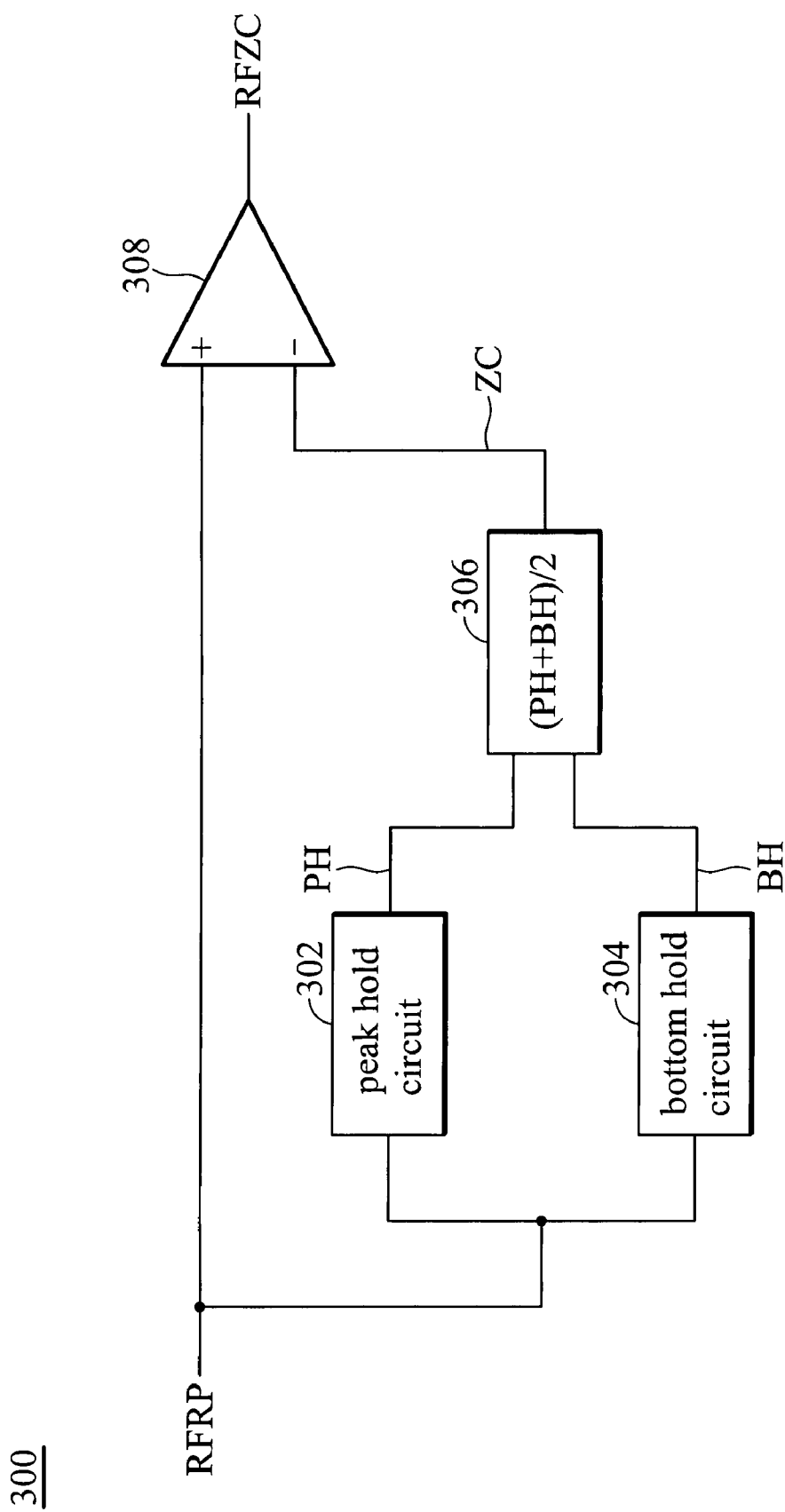
FIG. 3 shows a conventional radio frequency zero crossing signal generator.
Figure 4:
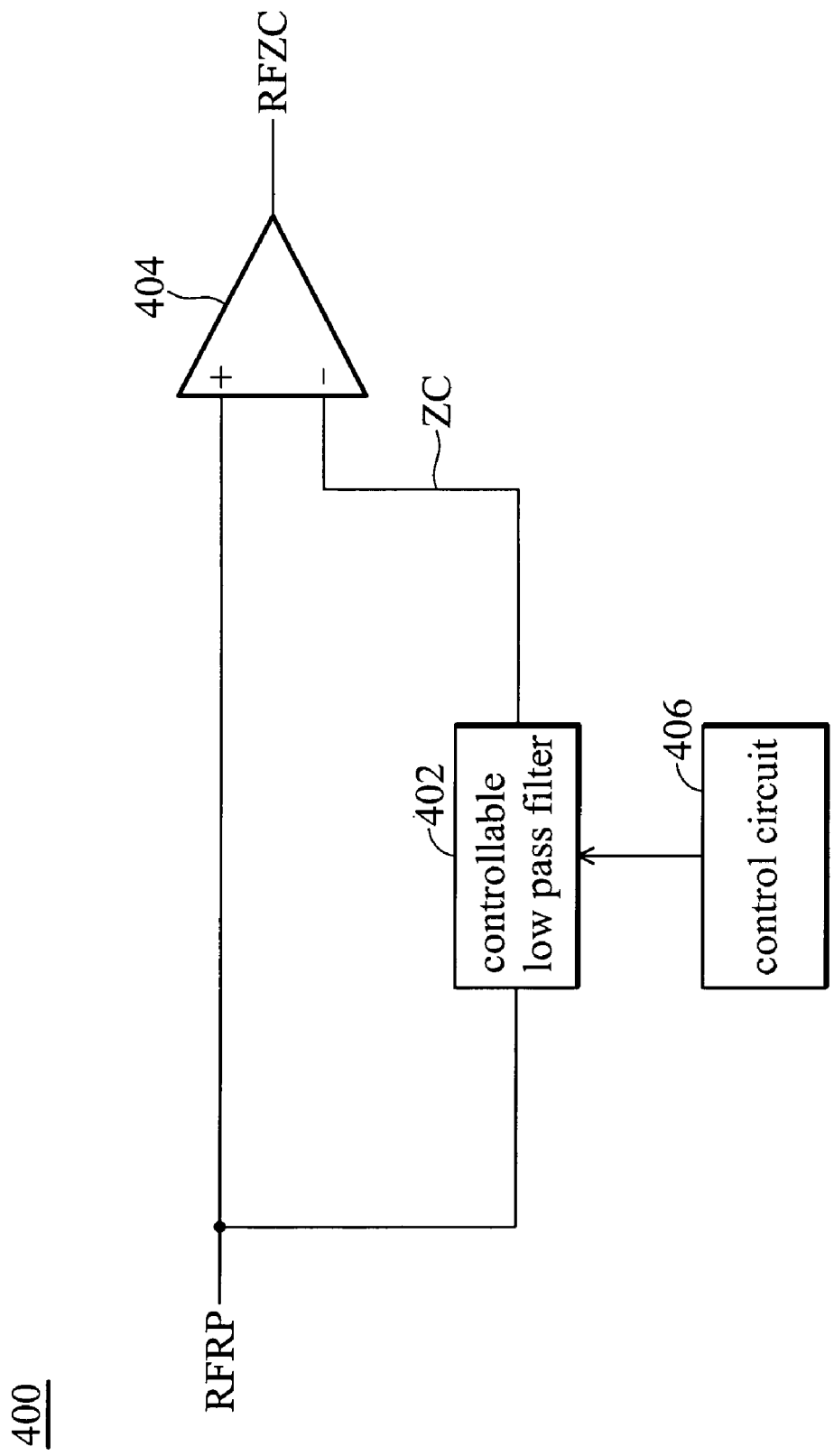
FIG. 4 shows an embodiment of the invention.

FIG. 4 shows an embodiment of the invention, a radio frequency zero crossing signal generator 400 for optical disc drives, comprising a controllable low pass filter 402, a comparator 404, and a control circuit 406. After receiving a radio frequency ripple RFRP generated when the optical disc drive scans an optical disc, the controllable low pass filter 402 outputs an average level (a.k.a. Zero Crossing level, ZC) of the radio frequency ripple RFRP. The comparator 404 compares the radio frequency ripple RFRP with the average level ZC to output a radio frequency zero crossing signal RFZC. When the optical pick-up reads a fingerprint defect, the control circuit 406 adjusts the cut-off frequency of the controllable low pass filter 402 to adjust the speed at which the controllable low pass filter 402 evaluates the average level ZC. To follow the dramatic change of the radio frequency ripple RFRP caused by fingerprint defects, the generation of the average level ZC is sped up by the control circuit 406 by increasing the cut-off frequency of the controllable low pass filter 402. Because the controllable low pass filter 402 has the ability of generating accurate average level ZC, the accuracy of tracking optical discs is obviously improved.

In another embodiment of the invention, the controllable low pass filter 402 is implemented by a resistor-capacitor low pass filter, comprising a capacitor and a plurality of resistors of distinct resistances. The cut-off frequency of the controllable low pass filter 402 is determined by the resistance of the resistors coupled to the capacitor. The connection between the resistors and the capacitor is determined by the control circuit 406.

Figure 5:
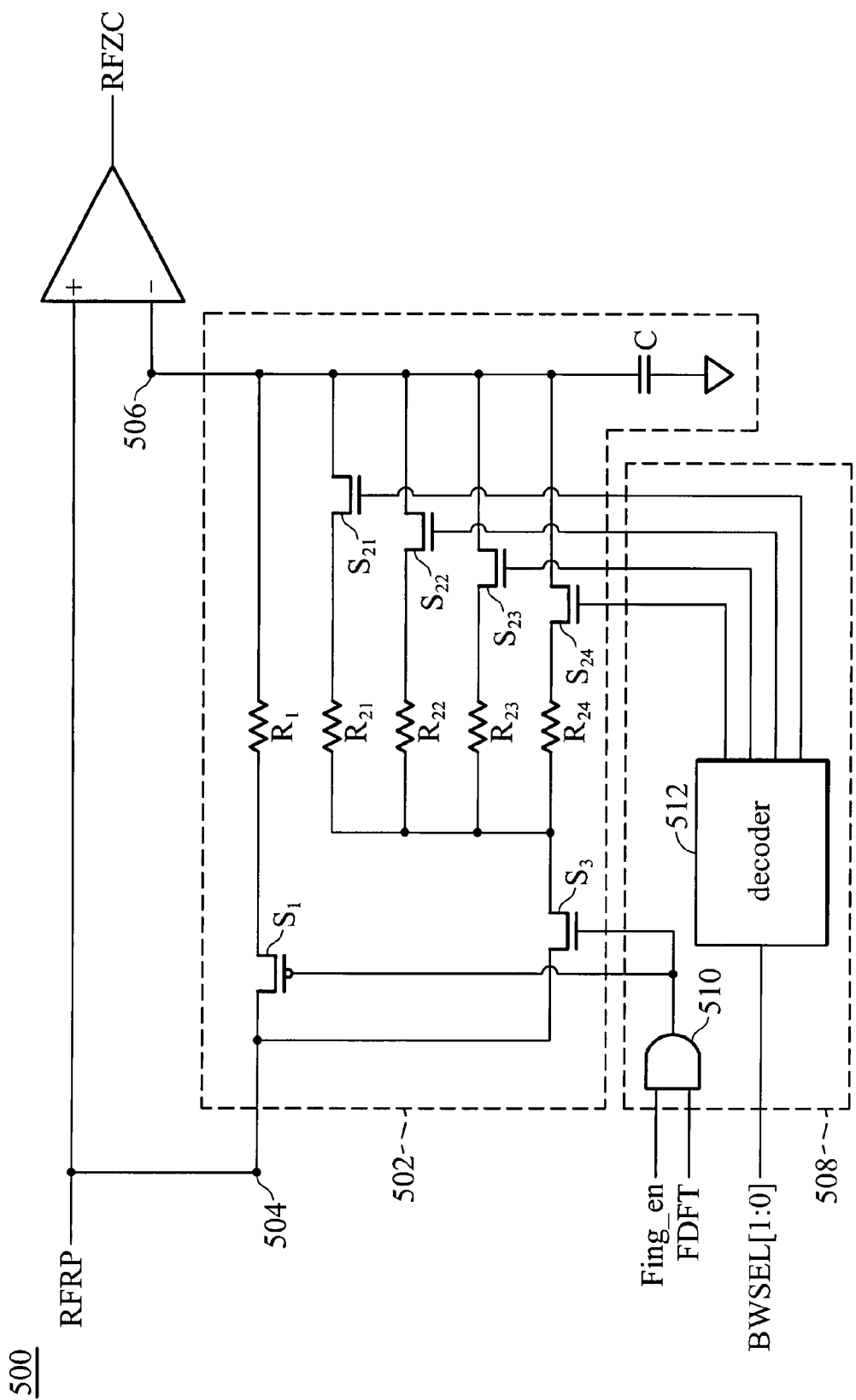
FIG. 5 shows another embodiment of the invention.

FIG. 5 shows another embodiment of the invention. The controllable low pass filter 502 of the radio frequency zero crossing signal generator 500 comprises a capacitor C, a first resistor $R_1$, a first switch $S_1$, a plurality of second resistors ($R_{21}$, $R_{22}$, $R_{23}$, and $R_{24}$), a plurality of second switches ($S_{21}$, $S_{22}$, $S_{23}$, and $S_{24}$) respectively corresponding to the second resistors ($R_{21}$, $R_{22}$, $R_{23}$, and $R_{24}$), and a third switch $S_3$. The resistance of any of the second resistors ($R_{21}$, $R_{22}$, $R_{23}$, and $R_{24}$) is different from that of the first resistor $R_1$. A radio frequency ripple RFRP is input to the controllable low pass filter 502 via an input terminal 504. The input terminal 504 is coupled to the first terminal of the first resistor $R_1$ via the first switch $S_1$. The second terminal of the first resistor $R_1$ is coupled to the capacitor C, and the connecting terminal therebetween is coupled to the output terminal 506 of the controllable low pass filter 502. The input terminal 504 of the controllable low pass filter 502 is further coupled to the first terminals of the second resistors ($R_{21}$, $R_{22}$, $R_{23}$, and $R_{24}$) via a third switch $S_3$. The second terminals of the second resistors ($R_{21}$, $R_{22}$, $R_{23}$, and $R_{24}$) are coupled to the capacitor C via their corresponding second switches ($S_{21}$, $S_{22}$, $S_{23}$, and $S_{24}$), and the connecting terminal therebetween is coupled to the output terminal 506. The first, second, and third switches ($S_1$, $S_{21}$, $S_{22}$, $S_{23}$, $S_{24}$, and $S_3$) are controlled by a control circuit 508. By controlling the connection between the resistors ($R_1$, $R_{21}$, $R_{22}$, $R_{23}$, and $R_{24}$) and the capacitor C, the control circuit 508 controls the cut-off frequency of the controllable low pass filter 502. When the optical pick-up reads a normal disc, the control circuit 508 connects the first switch $S_1$ and disconnects the third switch $S_3$. The controllable low pass filter 502 is a resistor-capacitor low pass filter comprising the first resistor $R_1$ and the capacitor C. When the optical pick-up reads a fingerprint defect, the control circuit 508 disconnects the first switch $S_1$, connects the third switch $S_3$. The control circuit 508 further connects/disconnects the second switches ($S_{21}$, $S_{22}$, $S_{23}$, and $S_{24}$) according to the signal degrade caused by the fingerprint defect. At this time, the controllable low pass filter 502 is a resistor-capacitor low pass filter composed of the capacitor C and the second resistors the corresponding second switches of which are turned on.

In the embodiment shown in FIG. 5, the control circuit 508 comprises an AND gate 510 and a decoder 512. When the optical disc drive is enabled to compensate fingerprint defects, a fingerprint defect compensation enable signal Fing_en is set to high. When the optical pick-up reads a fingerprint defect, a flag FDFT is switched to high, and the AND gate 510 outputs a signal of high to disconnect the first switch $S_1$ and connect the third switch $S_3$. A signal BWSEL[1:0] is generated according to the degree of the signal degradation caused by the fingerprint defect. The decoder 512 decodes the signal BWSEL[1:0] to a four bits signal to control the second switches ($S_{21}$, $S_{22}$, $S_{23}$, and $S_{24}$), with the result that the second switches ($S_{21}$, $S_{22}$, $S_{23}$, and $S_{24}$) are turned on/off according to signal degradation by the fingerprint defect, the cut-off frequency of the controllable low pass filter 502 varying with the status of the second switches ($S_{21}$, $S_{22}$, $S_{23}$, and $S_{24}$) can catch up with the dramatic change of the magnitude of the radio frequency ripple RFRP.

Figure 6:
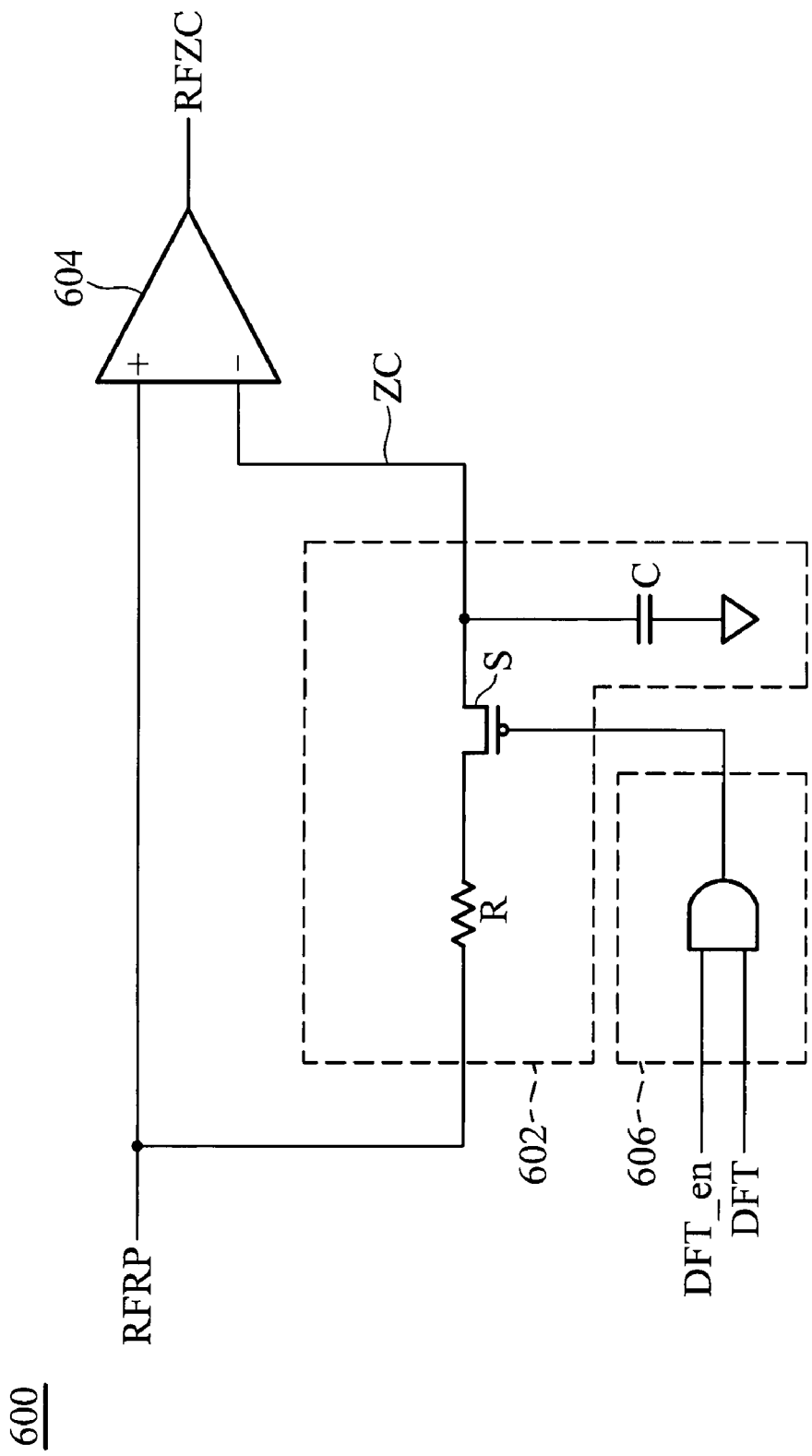
FIG. 6 shows another embodiment of the invention.

FIG. 6 shows another embodiment of the invention, a radio frequency zero crossing signal generator of optical disc drive 600, comprising a resistor-capacitor low pass filter 602, a comparator 604, and a control circuit 606. After receiving a radio frequency ripple RFRP of the optical disc drive, the resistor-capacitor low pass filter 602 outputs an average level ZC of the radio frequency ripple RFRP. The output of the resistor-capacitor low pass filter 602 (ZC) is coupled to one input terminal of the comparator 604. Another input terminal of the comparator 604 is coupled to the radio frequency ripple RFRP. The comparator 604 compares the radio frequency ripple RFRP with the average level ZC, and generates a radio frequency zero crossing signal RFZC. In addition to the resistors and capacitors contained in conventional resistor-capacitor low pass filters, the resistor-capacitor low pass filter 602 further comprises a switch S coupled between the resistors and the capacitors. Referring to FIG. 6, a switch S is coupled between the resistor R and the capacitor C. The switch S is initially turned on. When the function of compensating defects (e.g. scrape on the optical disc) is enabled, a defect compensation enable signal Dft_en is set to high. When the optical disc reads a defect, a signal DFT is switched to high, and a control circuit 606 (implemented by an AND gate in this case) outputs a signal of high to turns off the switch S to disconnect the resistor R and the capacitor C. The resistor-capacitor low pass filter stops charging/discharging the capacitor C, the voltage contained in the capacitor C is maintained, and the average level ZC output from the resistor-capacitor low pass filter 602 is also maintained. Thus, the dramatic shift, caused by defects, on the radio frequency ripple RFRP has no effect on the average level ZC output from the resistor-capacitor low pass filter 602. Compared to the conventional techniques, the embodiment shown in FIG. 6 reduces the time to restore the average level ZC to the normal range, thus the accuracy of the average level ZC is improved.

Figure 7:
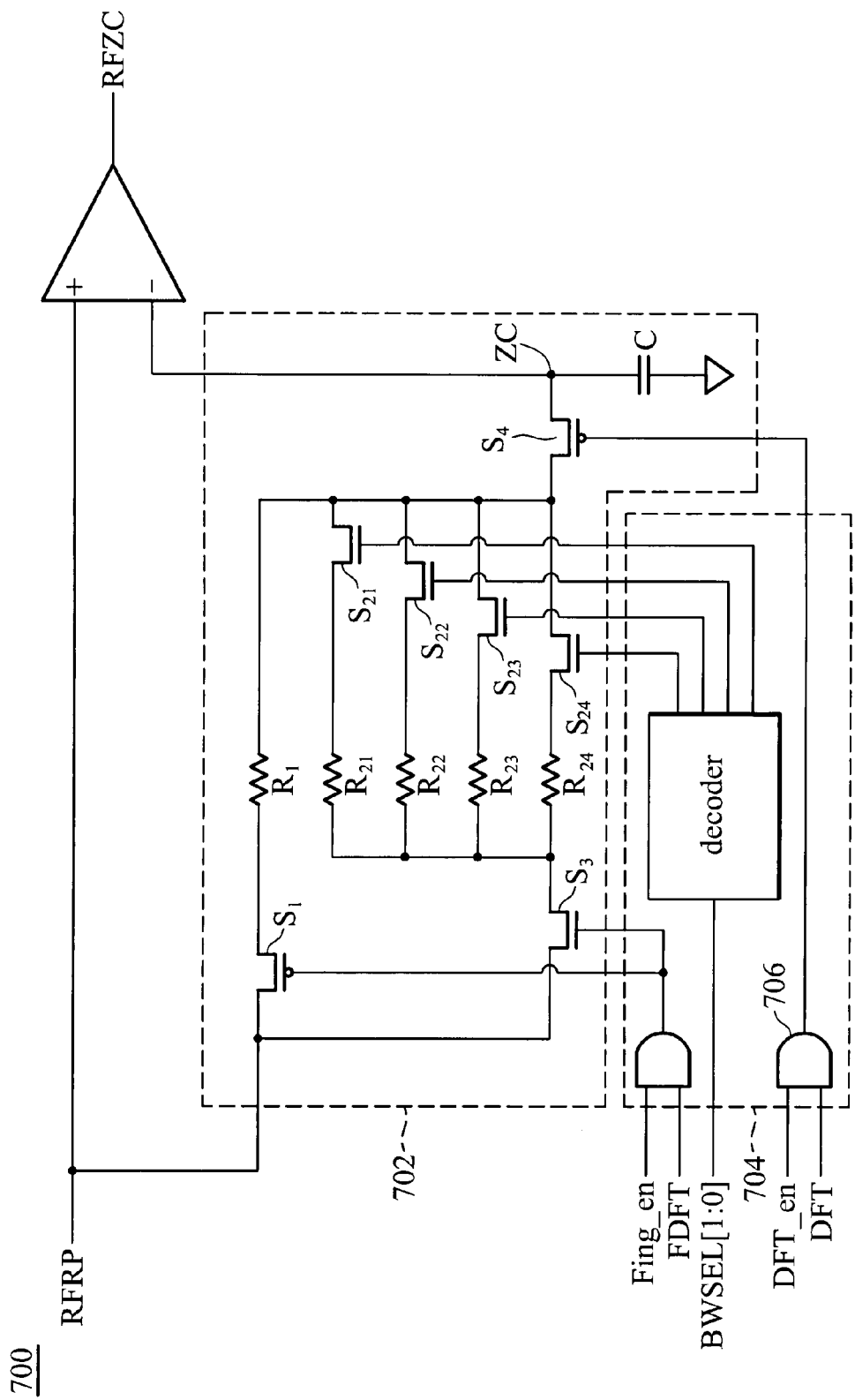
FIG. 7 shows another embodiment of the invention.

FIG. 7 shows another embodiment of the invention. Compared to FIG. 5, the controllable low pass filter 702 of the radio frequency zero crossing signal generator 700 further comprises a fourth switch $S_4$. The fourth switch $S_4$ couples the second switches ($S_{21}$, $S_{22}$, $S_{23}$, and $S_{24}$) to the capacitor C and is initially turned on. The fourth switch $S_4$ is disconnected only when the function of compensating defects on the optical disc is turned on and the optical pick-up reads the defect. When the fourth switch $S_4$ is disconnected, the controllable low pass filter 702 stops charging/discharging the capacitor C and the average level ZC output from the controllable low pass filter 702 is maintained.

Compared to the control circuit 508 shown in FIG. 5, the control circuit shown in FIG. 7 further comprises a AND gate 706. When the function of compensating defects on the optical disc is enabled, the defect compensation enable signal Dft_en is set to high. When the optical pick-up reads a defect, a flag DFT is switched to high and the AND gate 706 outputs a signal of high to disconnects the fourth switch $S_4$ to stop charging/discharging the capacitor C. The average level ZC output from the controllable low pass filter 702 is maintained.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded to the broadest interpretation so as to encompass all such modifications and similar arrangements.

What is claimed is:

1. A radio frequency zero crossing signal generator of an optical disc drive, comprising:

a controllable low pass filter, receiving a radio frequency ripple of the optical disc drive, and averaging the magnitude of the radio frequency ripple to generate an average level;

a comparator, coupling to the controllable low pass filter, and comparing the radio frequency ripple with the average level generated by the controllable low pass filter to generate a radio frequency zero crossing signal; and a control circuit, coupling to the controllable low pass filter, and adjusting a cut-off frequency of the controllable low pass filter when the optical disc drive reads a fingerprint defect on an optical disc, wherein the speed at which the controllable low pass filter generates the average level is dependent on the cut-off frequency of the controllable low pass filter, wherein the controllable low pass filter comprises a capacitor, a first resistor, a first switch, a plurality of second resistors, a plurality of second switches corresponding to the second resistors, and a third switch, wherein the resistance of the first resistor is different from any of the second resistors, the controllable low pass filter has an input terminal coupling to a first terminal of the first resistor via the first switch, a second terminal of the first resistor is coupled to the capacitor at an output terminal of the controllable low pass filter, the input terminal of the controllable low pass filter is further coupled to first terminals of the second resistors via the third switch, the second terminals of the second resistors are coupled to the capacitor via the corresponding second switches, and the control circuit adjusts the cut-off frequency of the controllable low pass filter by controlling the first, second, and third switches.

2. The radio frequency zero crossing signal generator as claimed in claim 1, wherein the controllable low pass filter is a resistor-capacitor low pass filter.

3. The radio frequency zero crossing signal generator as claimed in claim 2, wherein the controllable low pass filter comprises a capacitor and a plurality of resistors of distinct resistances, wherein the cut-off frequency of the controllable low pass filter is determined by the way the control circuit couples the resistors to the capacitor.

4. The radio frequency zero crossing signal generator as claimed in claim 1, wherein the control circuit turns on the first switch and turns off the third switch when the optical disc drive reads a normal range of the optical disc.

5. The radio frequency zero crossing signal generator as claimed in claim 4, when the optical disc drive reads the fingerprint defect, the control circuit turns off the first switch, turns on the third switch, and controls the status of the second switches according to the degree of interference of a signal of the optical device affected by the fingerprint defect to set the cut-off frequency of the controllable low pass filter.

6. The radio frequency zero crossing signal generator as claimed in claim 3, wherein the controllable low pass filter further comprises a fourth switch coupling the resistors to the capacitor and being initially turned on, when the optical disc drive detects a defect on the optical disc, the control circuit turns off the fourth switch and stops charging/discharging the capacitor to hold the average level.

7. A radio frequency zero crossing signal generator of an optical disc drive, comprising:
- a resistor-capacitor low pass filter, receiving a radio frequency ripple generated by the optical disc drive and generating an average level of the magnitude of the radio frequency ripple;
- a comparator, coupling to the resistor-capacitor low pass filter and comparing the radio frequency ripple with the average level to generate a radio frequency zero crossing signal; and
- a control circuit, coupling to the resistor-capacitor low pass filter to turn off a switch coupling between the resistor and capacitor of the resistor-capacitor low pass filter when the optical disc drive detects a defect, when the switch is turned off, the resistor and the capacitor are disconnected and the charging/discharging paths of the capacitor are cut off, wherein the controllable low pass filter comprises a capacitor, a first resistor, a first switch, a plurality of second resistors, a plurality of second switches corresponding to the second resistors, and a third switch, wherein the resistance of the first resistor is different from any of the second resistors, the controllable low pass filter has an input terminal coupling to a first terminal of the first resistor via the first switch, a second terminal of the first resistor is coupled to the capacitor at an output terminal of the controllable low pass filter, the input terminal of the controllable low pass filter is further coupled to first terminals of the second resistors via the third switch, the second terminals of the second resistors are coupled to the capacitor via the corresponding second switches, and the control circuit adjusts the cut-off frequency of the controllable low pass filter by controlling the first, second, and third switches.

* * * * *